UNITED STATES PATENT OFFICE.

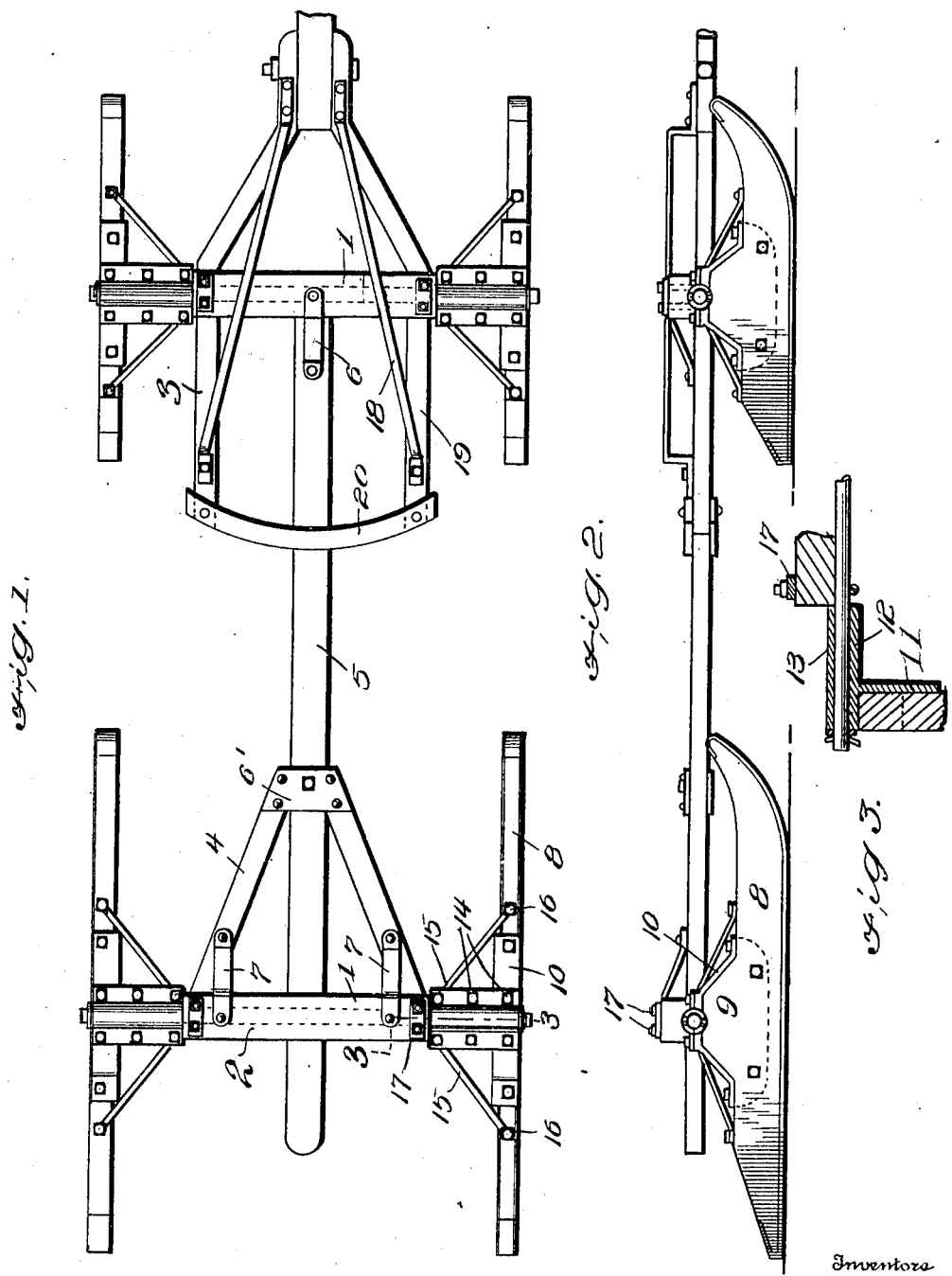

GEORGE J. GODDIN AND HARLEY B. EVANS, OF ELKINS, WEST VIRGINIA.

SLED-KNEE.

970,324.  Specification of Letters Patent.  Patented Sept. 13, 1910.

Application filed June 22, 1909. Serial No. 503,665.

*To all whom it may concern:*

Be it known that we, GEORGE J. GODDIN and HARLEY B. EVANS, citizens of the United States, residing at Elkins, in the county of Randolph and State of West Virginia, have invented new and useful Improvements in Sled-Knees, of which the following is a specification.

This invention relates to sled knees, the object in view being to provide a special construction of all-metal knees for connecting sled runners to a truck so as to admit of the free oscillatory movement of all of the sled runners independently of each other thereby enabling the sled as a whole to proceed over any and all inequalities in the ground, the improved knees also rendering the sled as a whole susceptible of carrying a very heavy load without liability of injury to the working parts thereof.

With the above and other objects in view, the nature of which will more fully appear as the description proceeds, the invention consists in the novel construction, combination and arrangement of parts as herein fully described, illustrated and claimed.

In the accompanying drawings:—Figure 1 is a plan view of a sled embodying the present invention. Fig. 2 is a side elevation of the same. Fig. 3 is an enlarged detail vertical section taken in line with one of the axles.

The truck or framework of the sled is shown as comprising front and rear axles 1 and 2, respectively, provided with hounds 3 and 4 and connected together by means of a reach 5, the latter being connected to the front axle by a hammer strap 6 and connected to the rear section of the truck by a coupling 6′, the rear hounds 4 being shown as connected to the rear axle by means of braces or hammer straps 7. Upon each of the spindles of both axles there is mounted a sled runner 8 which may be of any desired dimensions and provided with the usual upstanding knee portion 9.

The improved all-metal knee embodies an L-shaped or flanged body portion consisting of a horizontal top member 10 provided at one or both sides with a depending flange 11 the said body portion of the knee being adapted to bear upon and against the top of one side of the runner 8 as best illustrated in Fig. 3, wherein the body is shown as resting directly on top of the runner whereas the flange 11 is bolted or secured to one side of the runner. The knee also comprises an inwardly extending bearing arm 12 adapted to receive the adjacent spindle of the truck, the said bearing arm comprising a removable cap section 13 which is detachably secured by bolts screws or other fasteners 14 to the main body 12 of the inwardly extending arm.

From the inner end of the arm 12 outwardly diverging braces 15 extend to a point in line with the body portion of the knee and are adapted to be connected to the top of the runner 8 by means of bolts, screws or other fasteners 16.

17 designates clips for securing the sections of the axle together.

18 designates a pair of stays or braces connecting the front hounds 3 with the frame bars 19 of the fifth wheel segment 20, the last-named parts being of the usual construction and arrangement.

From the foregoing description, it will be observed that each runner has a long transverse bearing on the truck, the same being coextensive in length with the spindle which it receives, furthermore, that the inwardly extending arm of the knee is thoroughly braced fore and aft by means of the outwardly diverging braces. It will also be understood that each of the runners is adapted to rock at its upward and rear end, or in other words, adapted to oscillate independently of each and all of the other runners.

We claim:—

An L-shaped metal knee for sleds comprising a flanged body adapted to rest directly upon and bear against the top and side of the sled runner to which it is fastened, a sectional and tubular bearing arm extending laterally inward from said body and comprising a detachable cap section, and outwardly diverging braces having their inner ends connected to the inner end of the bearing arm and terminating at their outer ends in eyes located in line with the major axis of the flanged body and beyond the front and rear extremities of the body.

In testimony whereof we affix our signatures in presence of two witnesses.

GEORGE J. GODDIN.
HARLEY B. EVANS.

Witnesses:
S. L. MARSTILLE,
A. S. BOSWORTH.